United States Patent [19]
Mathoorasing et al.

[11] Patent Number: 6,111,678
[45] Date of Patent: Aug. 29, 2000

[54] MILLIMETER-WAVE OPTICAL SOURCE INTENDED FOR A DISTRIBUTION NETWORK OF RADIO OVER FIBER TYPE

[75] Inventors: Dean Mathoorasing, Toulinenux; Christophe Kazmierski, Morangis, both of France

[73] Assignee: France Telecom, Paris, France

[21] Appl. No.: 09/009,201

[22] Filed: Jan. 20, 1998

[30] Foreign Application Priority Data

Jan. 23, 1997 [FR] France .................................. 97 00670

[51] Int. Cl.[7] .................................................. H04B 10/12
[52] U.S. Cl. ........................ 359/173; 359/145; 359/161
[58] Field of Search ................................. 359/180, 188, 359/173, 161, 145

[56] References Cited

U.S. PATENT DOCUMENTS

| | | | |
|---|---|---|---|
| 5,519,528 | 5/1996 | Kodera et al. | 359/161 |
| 5,687,261 | 11/1997 | Logan | 385/24 |
| 5,710,651 | 1/1998 | Logan, Jr. | 359/145 |

OTHER PUBLICATIONS

Schmich H: "Comparison of Optical Millimetre–Wave System Concepts With Regard to Chromatic Dispersion" Electronic Letters, vol. 31, No. 21, Oct. 12, 1995, pp. 1848–1849, XP000553336.

Wake D et al: "Optical Generation of Millimeter–Wave Signals For Fiber–Radio Systems Using a Dual–Mode DFB Semiconductor Laser" IEEE Transactions on Microwave Theory and Techniques, vol. 43, No. 9, Part 2, Oct. 9, 1995, pp. 2270–2276, XP000524215.

Schmuck H et al: "Distribution of 60GHZ Signals To More Than 1000 Base Stations" Electronics Letters, vol. 30, No. 1, Jan. 6, 1994, pp. 59/60, XP000424697.

Patent Abstracts of Japan, vol. 017, No. 434 (E–1412), Aug. 11, 1993 & JP 05 091046 A (NEC Corp), Apr. 9, 1993.

Mathoorasing D et al., "38 GHz Optical Harmonic Mixer For Millimeter–Wave Radiowave Systems", Electronic Letters, 1995, 31, pp. 970–971.

J. F. Cadiou et al., "Les Composants Pour Conversion Optique–Radio", See, Journee D'Etudes, 1996.

Kim D Y et al., "Ultrastable Millimeter–Wave Signal Generation Using Hybrid Modelocking of a Monolothic DBR Laser", Electronic Letters, 1995, 31, pp. 733–734.

Novak D et al., "Millimeter–Wave Signal Generation Using Pulsed Semiconductors", Electronic Letters, 1994, 30 pp. 1430–1431.

*Primary Examiner*—Leslie Pascal
*Assistant Examiner*—Hahn Phan
*Attorney, Agent, or Firm*—Pearne & Gordon LLP

[57] ABSTRACT

Millimeter-wave optical source intended for a distribution network of radio over fiber type.

This source comprises a laser (2) coupled to at least one optical fiber (4) to distribute radio signals over fiber, means (12) of controlling the laser so that the latter generates a millimeter-wave carrier, and a dispersive medium (6) coupled to the laser able to shift the carrier phase and consequently an absorption peak appearing in the optical fiber.

11 Claims, 2 Drawing Sheets

MILLIMETER-WAVE OPTICAL SOURCE INTENDED FOR A DISTRIBUTION NETWORK OF RADIO OVER FIBER TYPE

DESCRIPTION

1. Technical Field

The present invention relates to a millimeter-wave optical source intended for a distribution network of radio over fiber type.

It applies in particular to broadband distribution of telecommunications services to a group of subscribers or to several groups of subscribers.

2. State of the Prior Art

Currently, several techniques are routinely used by researchers: direct modulation of lasers [see document(1)], external modulator [see documents (2) and (3)], modelocking of lasers [see documents (4) and (5)] and dual mode lasers [see document (6)].

The particulars of these documents (1) to (6), to which reference shall be made, are given at the end of this description.

Although their passband is limited (this passband is less than 30 GHz), lasers have also shown harmonic generation and mixing potential (indirect modulation) up to 40 GHz [see document (1)].

The technique described in document (1) consists of modulating the laser polarizing current with two signals of which one has a subharmonic frequency of the millimeter-wave carrier to be generated, and the other is for example a digital signal.

On account of the laser's nonlinearity, the digital signal is therefore transposed onto the millimeter-wave carrier with good efficiency.

With modulators, given their passband of more than 40 GHz, it is possible to generate millimeter waves either by direct external modulation or by indirect external modulation [see documents (2) and (3)].

In indirect modulation, this technique is similar to that used for lasers except that in modulators it is voltage which is modulated.

In direct modulation, modulation frequency is equal to the frequency of the millimeter wave carrier.

Another known technique uses laser modelocking.

In this case, the laser is modulated around the frequency of the laser cavity.

A fourth technique which, in respect of the modulator, is the extension of indirect modulation, consists of modulating an external modulator and optically filtering the spectrum emitted.

In one case modulation can be made at a frequency of f/2 and the optical carrier can be filtered, and in the other case modulation may be made at a frequency f and one of the sidebands can be filtered.

The last known technique consists of using a dual mode laser [see document (6)].

In this case, the laser, when it is polarized, emits light over two separate modes.

The distance between the two wavelengths associated with these two modes corresponds to the millimeter-wave frequency.

It is possible to synchronize the free oscillator formed by this laser by modulating it very strongly.

These known techniques have disadvantages.

In known networks, the dispersion of optical fibers is 17 ps/nm/km.

Owing to phase modulation inherent in the modulation of amplitude in semiconductors, this phase modulation, combined with the dispersion, modulates signal amplitude in a manner described by the Bessel response.

On this account, with certain fiber lengths, the modulation power that is subsequently detected electrically is greatly attenuated.

Most of the techniques mentioned above suffer from the limitation of dispersion, except the two last techniques cited.

For the modulator, in direct modulation, millimeter-wave frequency and sufficient power are required, which is fairly costly with frequencies of over 20 GHz.

In indirect modulation, this modulator is modulated in its nonlinear zone by a subharmonic of the frequency to be generated.

This leads to reduced modulation efficiency.

Dispersion restricts the use of a modulator to distances of less than 5 km.

Also, it is necessary to offset coupling losses with an optical amplifier.

In order to obtain sufficient power, the order of the harmonic must not be high.

With lasers, the order of the harmonic may reach as high as 8 with good efficiency, thereby allowing modulation frequency to be reduced.

However, although the attenuation peaks are 13 km distant at 38 GHz, the first peak exists between 0 and 3 km which hinders laser use in known networks.

Dispersion remains the predominant factor which limits the use of lasers.

With laser mode locking, as the pick-up range is generally narrow, there is a high risk of switch-over with temperature variations.

The technique which consists of omitting the optical carrier is more complex as it requires a counter-reaction to synchronize the wavelength with a filter.

Also, it remains sensitive to temperature variations and an unresolved stability problem of detected electric power [see document (2)] subsists in this configuration.

The dual mode laser technique is little sensitive to dispersion but has the disadvantage of leading to an equivalent line width corresponding to the convolution of both lines and of being sensitive to temperature variations.

Also, it is possible to synchronize the resulting pulse frequency with a subharmonic frequency with extremely high power.

This synchronization remains sensitive to temperature variations due to the high risk of switch-over (narrow pick-up band).

DISCLOSURE OF THE INVENTION

The present invention mainly associates a laser (preferably single-mode) with a dispersive medium having a dispersion ratio of $\beta''$ with a view to achieving a millimeter-wave optical source that is little sensitive to dispersion of the fibers which follow the source in a distribution network of radio over fiber type, which is able to convey data of any format (16QAM, QPSK or other) from one point to another or from one point to several points over distances of more than 15 km for a 38 GHz carrier and of more than 20 km for a 28 GHz carrier.

With this source, distribution over fiber of millimeter-wave signals carrying data is possible for points that are not necessarily-equidistant.

This source is little sensitive to temperature variations.

The detected electric power only decreases by approximately 3 dB for a temperature increase in the region of 10° C.

As dispersion restraint is high, this invention considerably simplifies the design of the optical source in comparison with known sources.

The invention also allows this source to be set in operation rapidly.

The distribution network may use a standard optical fiber (G652) as transmission medium to convey a millimeter-wave signal with data before this signal is emitted by one of more antennae radiating towards network subscribers.

The millimeter-wave optical source may operate at least up to 60 GHz, for example in the range extending from 20 GHz to 60 GHz.

A transimpedance amplifier may be integrated into the source laser in order to reduce electric coupling losses and consequently to increase the efficiency of the optical source.

In precise manner, the purpose of the present invention is a millimeter-wave optical source characterized in that it comprises:

a laser which is optically coupled to at least one optical fiber, this optical fiber being intended to distribute radio signals over fiber, laser control means which comprise an electric radio frequency generator in such manner that this laser generates a millimeter-wave carrier having a determined phase, this millimeter-wave carrier subsequently being sent in the optical fiber, and a dispersive medium which is optically coupled to the laser and able to shift the carrier phase and consequently an absorption peak appearing in the optical fiber so that the source is little sensitive to fiber dispersion.

According to a first particular embodiment of the source of this invention, the dispersive medium is optically coupled to the laser in direct manner.

According to a second particular embodiment, the dispersive medium is optically coupled to the laser in indirect mariner, at least one optical component being inserted in the fiber and the dispersive medium being associated with this optical component.

The optical component may be chosen from an optical coupler, an optical amplifier and an optical modulator.

Preferably, the laser is single-mode.

The frequency of the carrier may be 60 GHz or less.

This frequency may lie in the region ranging from 20 GHz to 60 GHz.

The laser control means may also comprise a generator of data in electric form in such manner that it can optically transpose the data on the optically generated millimeter-wave carrier.

The dispersion ratio of the dispersive medium may be approximately 60 ps/nm.

It is recalled that the dispersion ratio β" of the medium is such that:

$$\beta'' = \frac{1}{2\pi} \cdot \frac{d^2\beta}{dv^2}$$

β being the propagation constant related to this medium and ν the frequency of the laser.

The source that is the subject of the invention may also comprise an electric amplifier via which the laser control means control the laser, to increase the electric efficiency of this source.

The source that is the subject of the invention may be very compact allowing connections over a standard optical fiber up to at least 15 km.

The dispersive medium may be an integral part of the laser or may be an optical dispersion fiber of appropriate length.

BRIEF DESCRIPTION OF THE DRAWINGS

This invention will be better understood on reading the description of examples of embodiment below, given solely for guidance purposes and in no way restrictive, with reference to the appended drawings in which.

DETAILED DESCRIPTION OF PARTICULAR EMBODIMENTS

Figure 1:
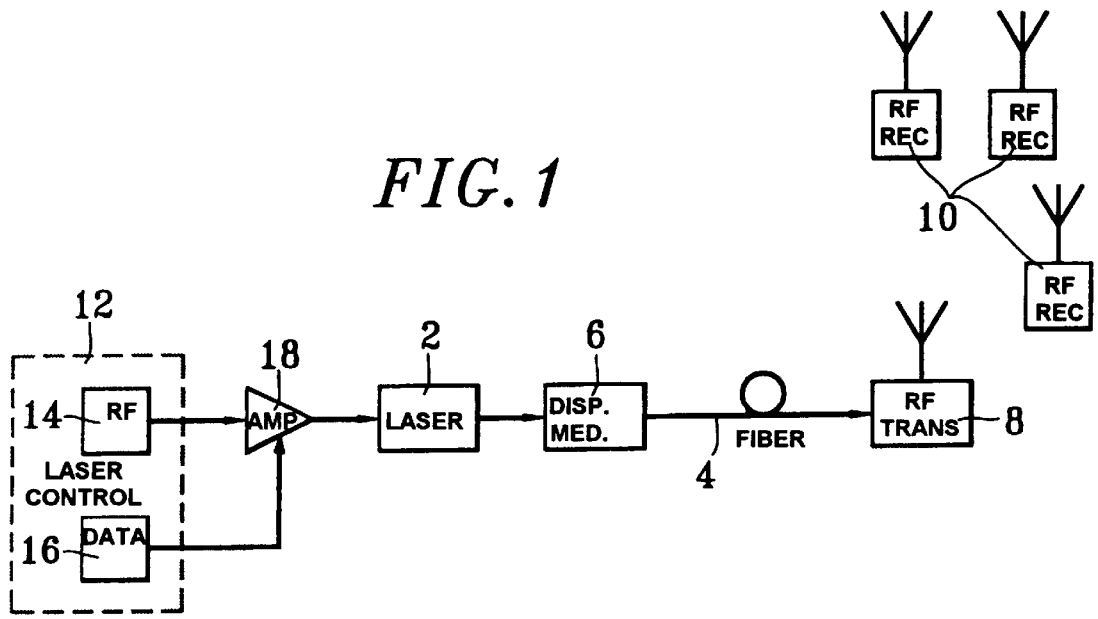
FIG. 1 is a diagram of a particular embodiment of the source that is the subject of the invention.

The optical source of the invention illustrated in the diagram in FIG. 1, comprises a single-mode laser 2 which is optically coupled to one end of an optical fiber 4, for example a standard fiber of G652 type.

The source in FIG. 1 also comprises a dispersive medium 6 which is directly coupled to laser 2, so that the light emitted by the latter crosses through dispersive medium 6 before entering fiber 4.

The other end of fiber 4 is connected to means 8 which convert into electric form the optical signals carried by fiber 4 and which emit these signals in the form of radio signals.

These radio signals are picked up by various subscribers 10.

In this way fiber 4 distributes radio signals over fiber.

The source of FIG. 1 also comprises means 12 f controlling laser 2.

These means 12 comprise an electric radio frequency generator 14 which controls laser 2 so that this laser generates a millimeter-wave carrier having a determined phase.

Generator 14 modulates the laser with a subharmonic frequency of the millimeter-wave frequency which it is desired to generate.

Dispersive medium 6 associated with the laser serves to shift the carrier phase and consequently the first absorption peak which appears at the start of fiber 4 of G652 type.

Control means 12 also comprise a generator 16 of binary or analogous data in electric form to transpose said data onto the carrier.

Also, the laser is controlled via an electric amplifier 18, for example a transimpedance amplifier, which receives the electric signals emitted by generator 14 and the data in electric form, emitted by generator 16.

Dispersive medium 6 whose dispersion ratio is 60 ps/nm for example may form an integral part of laser 2 or may be made up of a dispersion fiber.

Through this invention the electric power detected downstream from fiber 4 is little sensitive to the dispersion in this fiber.

Amplifier 18 is used to reduce electric losses by reflection and increases source efficiency.

Figure 2:
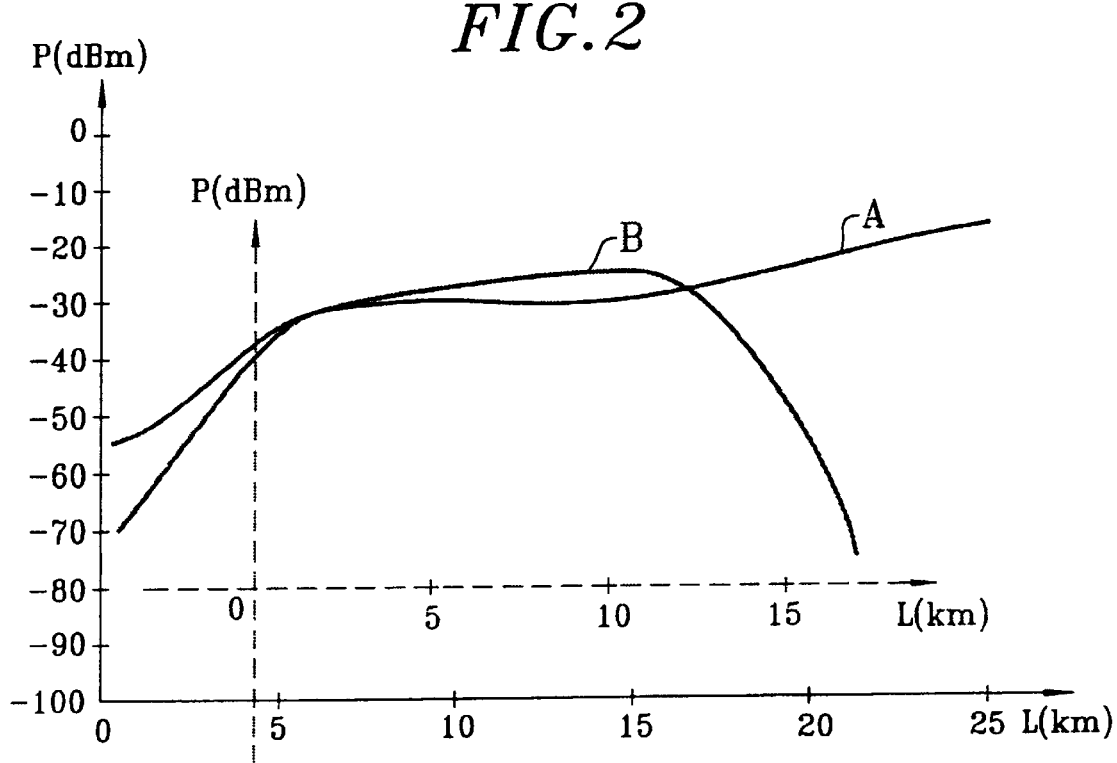
FIG. 2 shows the variations in power P of the 28 GHz carrier (curve A) and 38 GHz carrier (curve B) respectively for various fiber lengths L.

In FIG. 2 are shown the variations in power P of the 28 GHz carrier (curve A) and 38 GHz carrier (curve B) respectively for various G652 fiber lengths L.

The frequency of electric modulation is 7 GHz for 28 GHz and 9.5 GHz for 38 GHz and the modulation power at the amplifier inlet is 3 dBm.

There is no dispersive medium.

An absorption peak of the radio frequency electric power detected at 38 GHz is observed between 0 and 3 km and a further peak at around 18 km.

Between 4 and 18 km this radio frequency power at 38 GHz remains virtually constant.

Owing to the phase modulation inherent in amplitude modulation, this phase modulation, combined with the dispersion, modulates the amplitude of the signal in the manner described by the Bessel response.

At certain fiber lengths and in relation to the power of radio frequency modulation, the frequency generated is greatly attenuated.

The attenuation of the millimeter-wave carrier has an optical period of 13 km at 38 GHz and of more than 20 km at 28 GHz.

At 38 GHz, this period is 20 km if the subharmonic frequency of modulation is 7.6 GHz.

In accordance with the invention, the dispersive medium is added which leads to a dispersion of 3 to 4 km to fictitiously shift the first absorption peak towards negative distances.

This is illustrated by the dotted-line axes in FIG. 2 which materialize the shift of the origin and consequently of the absorption peak.

Other embodiments of the invention are possible, in which the laser is coupled in indirect manner to the dispersive medium.

Figure 3:
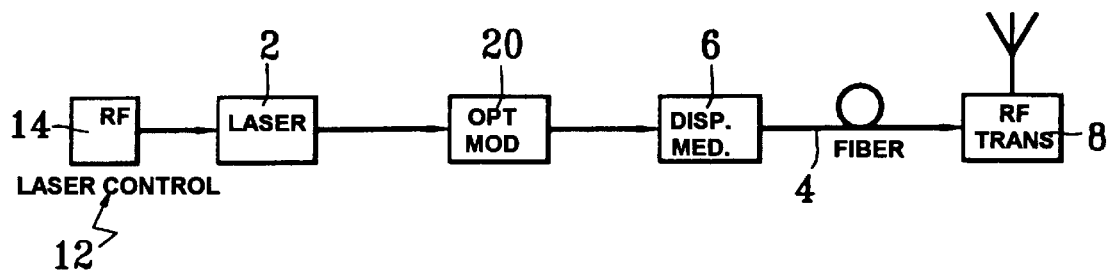
FIGS. 3 to 5 are diagrams showing other particular embodiments of the source that is the subject of the invention.

The source of the invention illustrated in the diagram in FIG. 3, differs from that of FIG. 1 in that the laser is solely controlled by generator 14 with no intermediary amplifier, and is coupled to dispersive medium 6 via an optical modulator 20 which is directly coupled to medium 6 and which transposes data on the millimeter-wave carrier generated by laser 2.

Figure 4:
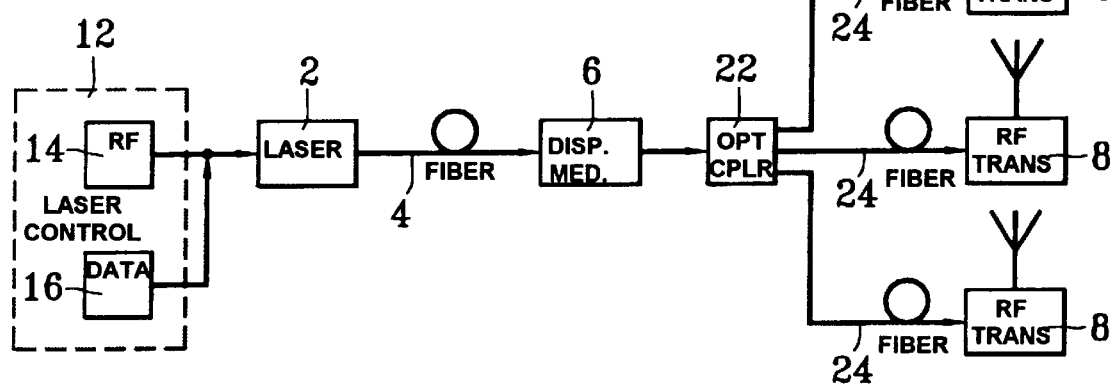

The source of the invention illustrated in FIG. 4 differs from that of FIG. 1 in that dispersive medium 6 is positioned at the other end of fiber 4 and is directly coupled to an optical coupler 22 of type 1 to N, N having the value of 3 in the example shown, so that the signals exiting laser 2 may be injected in the ends of N optical fibers 24 whose other ends are respectively connected to radio transmitting means 8 identical to means 8 used in the case of FIG. 1.

Figure 5:
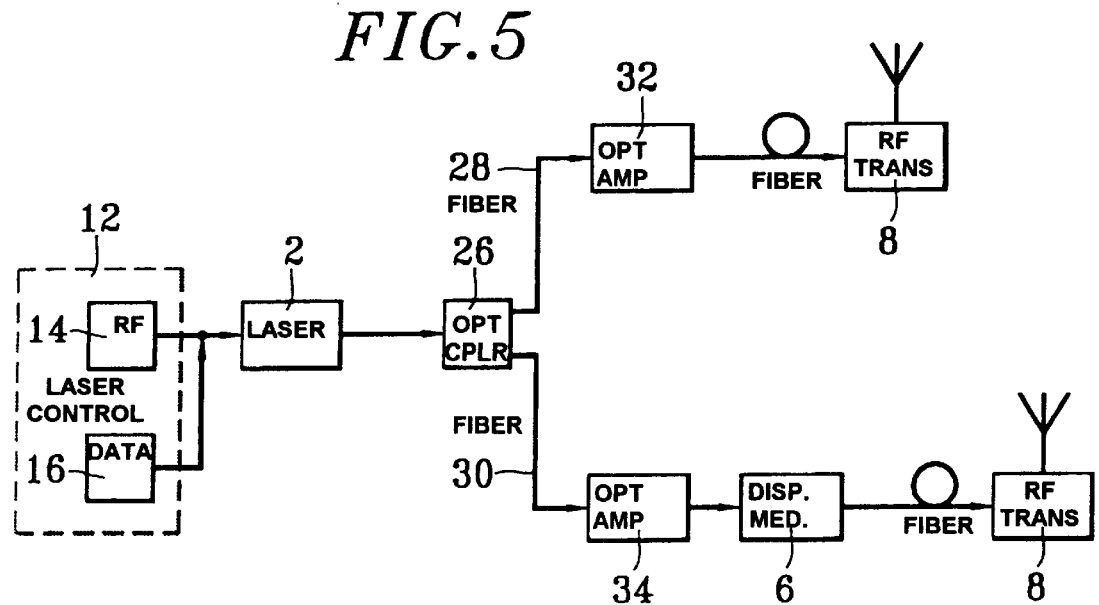

In the case shown in FIG. 5, laser 2 is controlled by generator 12 of FIG. 1 and directly coupled to an optical coupler 26 of type 1 to 2 from which depart two optical fibers 28 and 30.

Fiber 28 is connected to radio transmitting means 8 via an optical amplifier 32.

Fiber 30 is also connected to radio transmitting means 8 via an optical amplifier 34 and via dispersive medium 6 which is directly coupled to this amplifier.

The documents cited in this disclosure are the following:
(1) D. Mathoorasing, J. F. Cadiou, C. Kazmierski, E. Penard, P. Legaud and J. Guena, "38 GHz optical harmonic mixer for millimeter-wave radiowave systems", Electron. Lett., 1995, 31, pp 970–971

(2) H. Schmuk, R. Heidmann, R. Hofstetter, "Distribution of 60 GHz signals to more than 1000 base stations", Electron. Lett., vol.30, N°1, pp 59–60,1994.
(3) J. F. Cadiou et al, "Les composants pour conversion optique-radio" SEE, Journée d'études, 1996.
(4) D. Y. Kim, M. Pelusi, Z. Ahmed, D. Novak, H. F. Liu and Y. Ogawa, "Ultrastable millimeter-wave signal generation using hybrid modelocking of a monolithic DBR laser", Electron. Lett., 1995, 31, pp 733–734.
(5) D. Novak and R. S. Tucker, "Millimeter-wave signal generation using pulsed semiconductors", Electron. Lett., 1994, 30, pp 1430–1431.
(6) D. Wake, Claudio R., Limaand Philip A. Davies, "Optical generation of millimeter-wave signals for fiber-radio systems using a dual-mode DFB semiconductor laser", ISEE Trans. Microwave Theory Tech., vol. 43, 1995, pp 2270–2276.

What is claimed is:

1. Millimeter-wave optical source characterized in that it comprises:
   a laser (2) optically coupled to at least one optical fiber, this optical fiber being intended to distribute radio signals over fiber,
   means (12) of laser control which comprise an electric radio frequency generator (14) so that this laser generates a millimeter-wave carrier having a determined phase, this millimeter-wave carrier being subsequently sent in the optical fiber, and
   a dispersive medium (6) which is optically coupled to the laser and able to shift the carrier phase and consequently shift an absorption peak appearing in the optical fiber.

2. Source in accordance with claim 1, in which the dispersive medium (6) is optically coupled to the laser in direct manner.

3. Source in accordance with claim 1, in which the dispersive medium (6) is optically coupled to the laser in indirect manner, at least one optical component being inserted in the fiber and the dispersive medium being associated with this optical component.

4. Source in accordance with claim 3, in which the optical component is chosen from an optical coupler (22), an optical amplifier (34) and an optical modulator (20).

5. Source in accordance with claim 1, in which the laser (2) is single-mode.

6. Source in accordance with claim 1, in which the frequency of the carrier is 60 GHz or less.

7. Source in accordance with claim 6, in which the frequency of the carrier lies in the region ranging from 20 GHz to 60 GHz.

8. Source in accordance with claim 1, in which the means (12) of laser control also comprise a generator (16) of data in electric form in such manner as to be able to optically transpose the data on the optically generated millimeter-wave carrier.

9. Source in accordance with claim 1, in which the dispersion ratio of the dispersive medium (6) is approximately 60 ps/nm.

10. Source in accordance with claim 1, further comprising an electric amplifier (18) via which the laser control means (12) control the laser.

11. Source according to claim 1, wherein said absorption peak is a first absorption peak appearing in the optical fiber and said dispersive medium is provided for shifting said first absorption peak toward negative distances with respect to the origin of the optical fiber.

* * * * *